C. H. LOEW.
PASTEURIZER.
APPLICATION FILED JAN. 21, 1914.
1,215,561.
Patented Feb. 13, 1917.
3 SHEETS—SHEET 1.
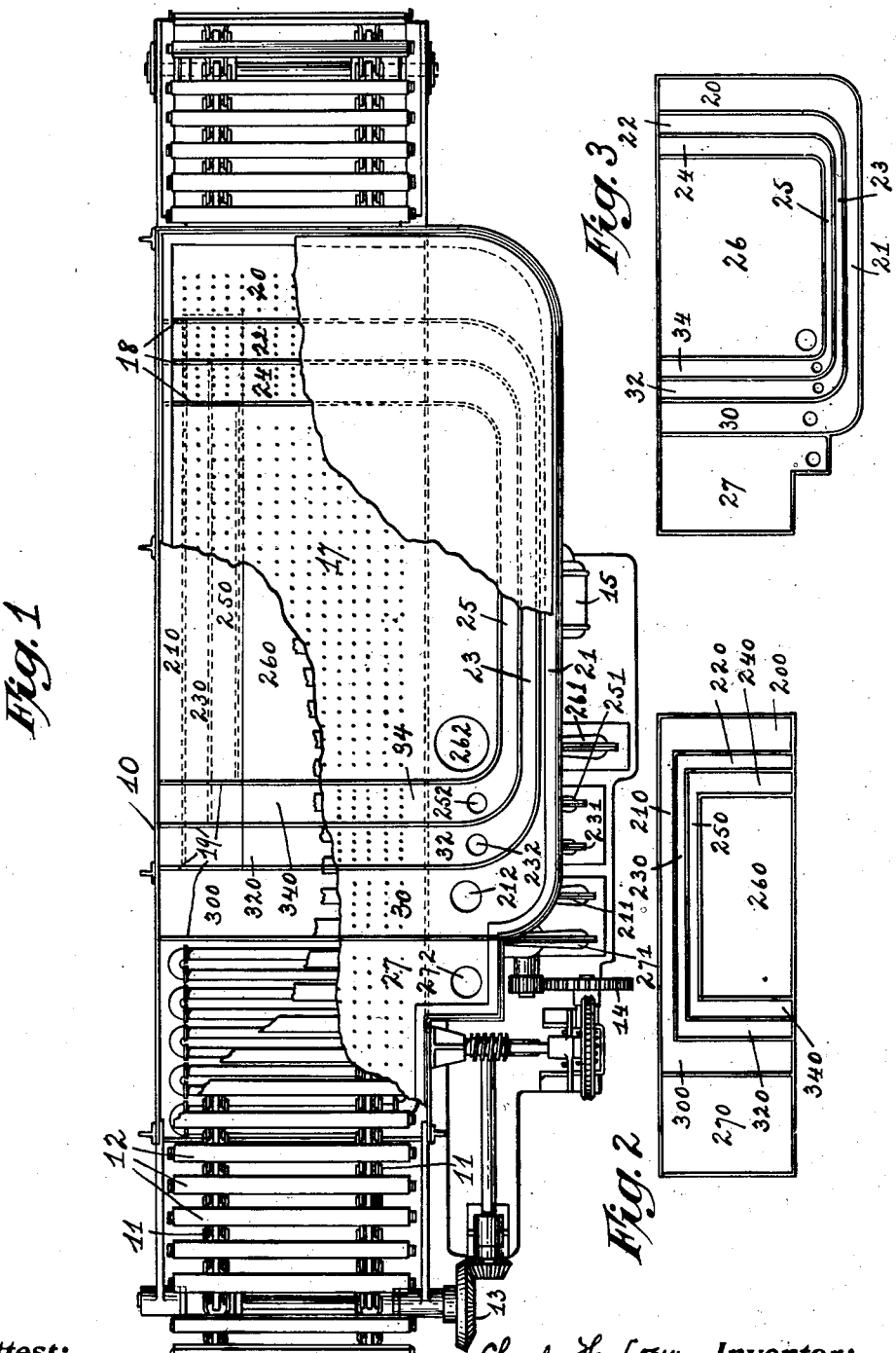
Attest:
Helen J. Fitzpatrick
Stephen B. Newton
Charles H. Loew, Inventor:
by William R. Baird
his Atty

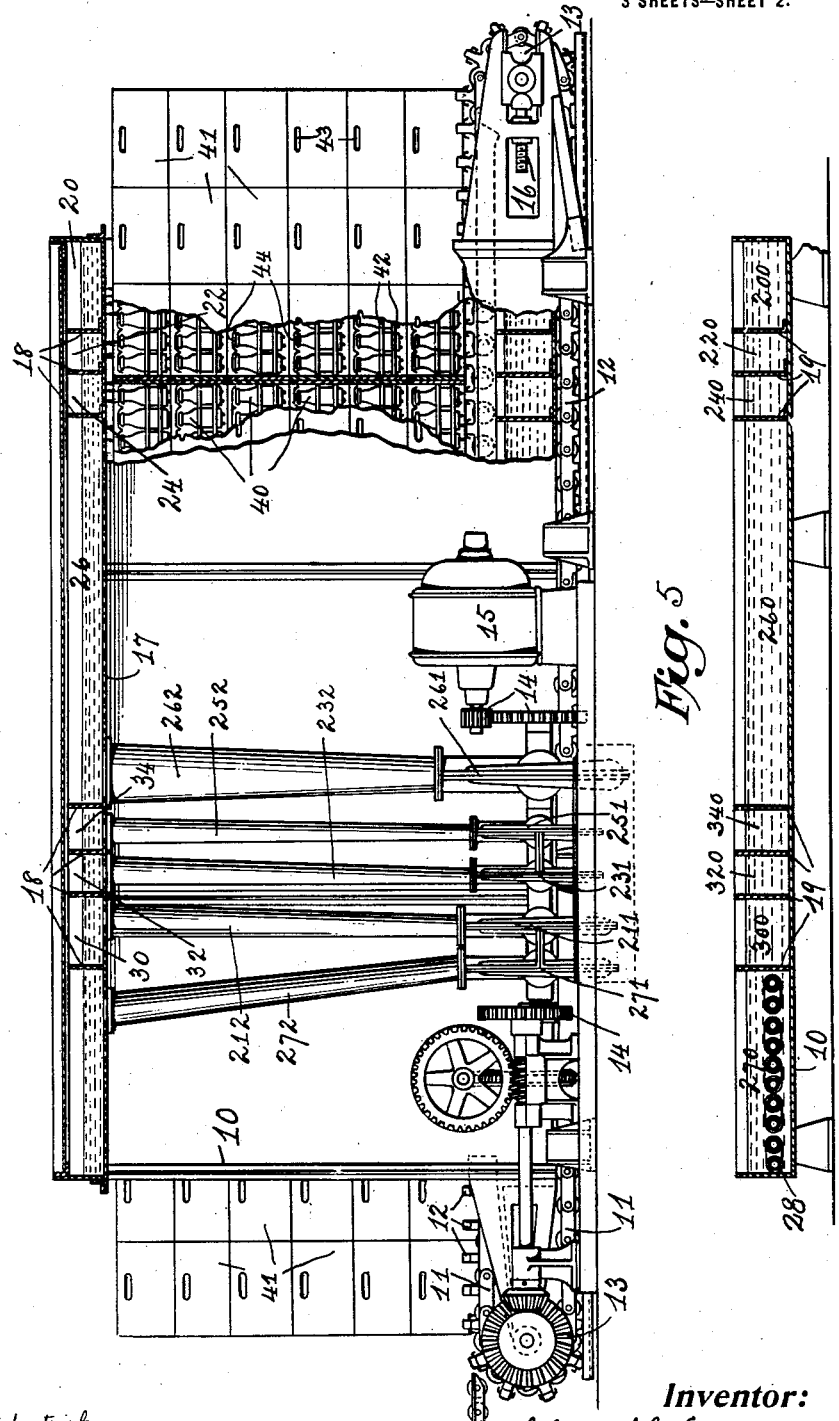

C. H. LOEW.
PASTEURIZER.
APPLICATION FILED JAN. 21, 1914.
1,215,561.
Patented Feb. 13, 1917.
3 SHEETS—SHEET 3.
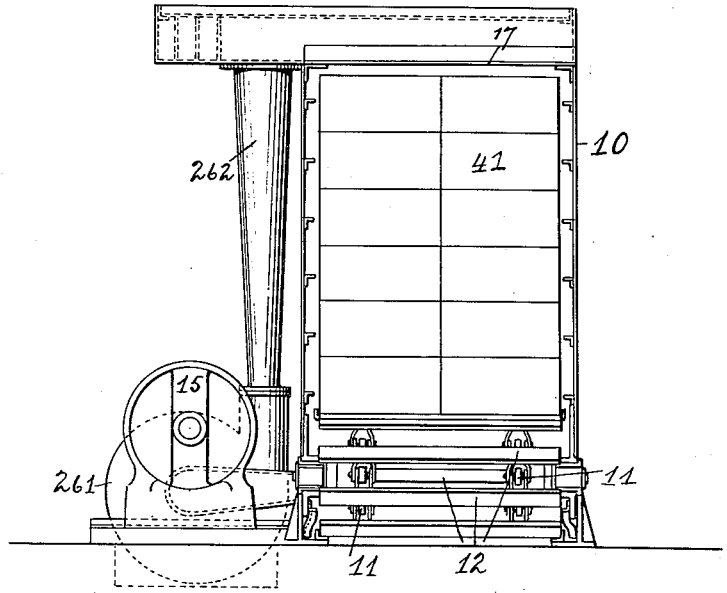
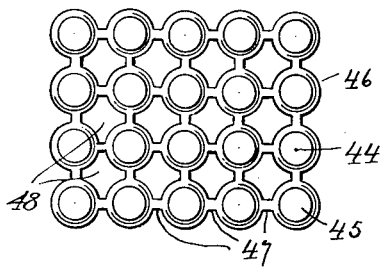
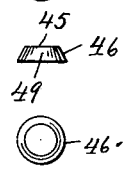
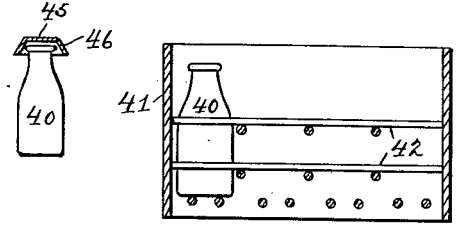
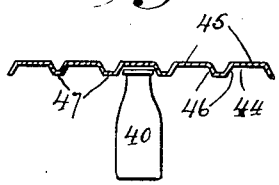
Attest:
Helen V. Fitzpatrick
Stephen B. Newton
Charles H. Loew, Inventor:
by William R. Baird
his Atty

UNITED STATES PATENT OFFICE.

CHARLES H. LOEW, OF LAKEWOOD, OHIO.

PASTEURIZER.

1,215,561. Specification of Letters Patent. Patented Feb. 13, 1917.

Application filed January 21, 1914. Serial No. 813,413.

*To all whom it may concern:*

Be it known that I, CHARLES H. LOEW, a citizen of the United States, residing at Lakewood, in the county of Cuyahoga and State of Ohio, have invented certain new and useful Improvements in Pasteurizers, of which the following is a specification.

This invention relates to the pasteurization of milk in bottles and its novelty consists in the construction and adaptation of the parts of the device used to effectuate the purpose and the manner and mode by which it is accomplished.

The pasteurization of milk is now for commercial purposes usually accomplished in bulk by placing the milk in large containers holding many gallons in which it is heated gradually to about 140 or 145 degrees Fahrenheit, and maintained at that temperature for thirty or forty minutes. After this it is gradually cooled to about 40 degrees Fahrenheit and filled into the trade packages. The time taken in bringing the mass of liquid to the proper temperature is about thirty minutes, the time of pasteurization is about the same and the cooling time a little shorter possibly, so at any rate over an hour's time is consumed in treating the milk in this way. During this process certain units of heat are lost in attaining the desired temperature and in the same way certain units of cold (if such an expression may be used) are lost in subsequently reducing the temperature. The bottles are usually warm when the milk is put into them and this injures the milk which is cold. If the bottles are first cooled it costs time and labor. After pasteurization the milk is subject to contamination from contact with the air and the bottles. The closing caps are not sterilized and afford another source of contamination. The devices for transferring the milk to the bottles afford yet another source and no matter how much care is taken the milk is subject to germ infection from the time the temperature in the tanks begins to be lowered until it reaches the consumer.

By means of my invention most of the sources of infection by germs is eliminated and time and expense is saved. This is accomplished briefly by placing the milk in bottles as soon as delivered at the dairy and securely sealing them, heating the milk while in the containers out of contact with the air and thus pasteurizing it, cooling it while in the same containers and delivering it to the consumer without contaminating contact with anything and at the same time by an exchange of heat energy saving time, labor and money.

In the drawings there is illustrated an apparatus adapted to be used in carrying out the invention. Figure 1 is a top plan view with parts broken away to show concealed parts; Fig. 2 is a diagrammatic plan of the lower compartments on a smaller scale; Fig. 3 is a similar plan of the upper compartments; Fig. 4 is a side elevation with parts broken away to show concealed parts; Fig. 5 is a longitudinal section through the lower compartments; Fig. 6 is a side elevation; Fig. 7 is a plan of the multiple bottle protector, and Fig. 8 is a section thereof; Fig. 9 illustrates the single bottle protector and Fig. 10 is a section of one of the bottle boxes.

In the drawings, 10 is a frame of steel or other suitable material, preferably longer than wide, of a height exceeding its width, open at each end and closed at the top and bottom, the space within the frame constituting a chamber which is divided vertically into zones as hereinafter described. A conveyer consisting of two parallel chains 11, 11 with cross slats 12, 12 is adapted to be moved through this chamber from right to left by means of sprocket wheels or other suitable mechanism indicated at 13 through a train of gearing indicated at 14 and deriving its movement from a suitable motor indicated at 15. There is a take up device of usual form indicated at 16. The conveyer is illustrated as an endless conveyer the operative stretch of which passes through the treating chamber and the return stretch of which passes beneath the bottom of the frame, but it will be understood that any kind of conveyer moved at a suitable speed in any usual way and adapted for the stated purpose may be employed.

The frame 10 is provided with a perforated ceiling indicated at 17 and the space between it and the top of the frame is divided by suitable partitions 18 into transverse compartments 20 and 30 connected by a longitudinal trough 21; 22 and 32 connected by a trough 23; 24 and 34 connected by a trough 25, a central compartment 26 and a lateral compartment 27. In a similar way the bottom of the frame is divided by suitable partitions 19 into transverse compartments 200 and 300 connected by a longitudinal trough 210; 220 and 320 connected by a trough 230; 240 and 340 connected by a trough 250, a central compartment 260, and a lateral compartment 270 containing refrigerating means indicated at 28.

A power driven pump 211 transfers the contents of the lower compartments 200 and 300 through a conduit 212 to the upper compartments 20 and 30; a second pump 231 transfers the contents of the compartments 220 and 320 through a conduit 232 to the compartments 22 and 32; a third pump 251 transfers the contents of the compartments 240 and 340 through a conduit 252 to the compartments 24 and 34; a fourth pump 261 transfers the contents of the compartment 260 through a conduit 262 to the compartment 26, and a fifth pump 271 transfers the contents of the compartment 270 through a conduit 272 to the compartment 27.

The bottles 40 containing the milk to be pasteurized are placed in shipping cases or boxes 41 open at the top and perforated at the bottom and provided, if desired, with shelving or partitions indicated at 42 and with hand holes 43. Each case is provided with a multiple protecting cover 44 which fits over the series of bottles in each case. This comprises a series of covers each provided with an upper surface 45 impervious to water and with a dependent annular flange 46 adapted to shed the water. The covers are united by suitable ligaments 47 to form a multiple whole leaving spaces 48 between the covers. Individual covers 49 without the ligaments may be employed if the bottles are insufficient in any instance to fill a case.

The apparatus is likewise provided with steam pipes for heating the contents of the various compartments where they are intended to be raised above a normal temperature, overflow pipes, air pipes, thermostats and other appliances and appurtenances usual to the art. These are not shown in the drawings in order not to confuse the description. Their particular application and adaptation can readily be comprehended by one skilled in the art.

In general, it will be understood that water at various temperatures is delivered to the upper series of compartments, that it is discharged in showers through the perforated ceiling 17 and after contacting with the milk bottles descends to the lower compartments whence it is pumped up to the upper compartments and used again. The temperature of the water in the compartments 20 and 30 is about 60 degrees Fahrenheit; that of the water in the compartments 22 and 32 is about 100 degrees, that of the water in the compartments 24 and 34 about 130 degrees, and that of the water in the compartments 26 and 260 about 140 degrees, or a suitable pasteurizing temperature. The temperature of the water in the compartments 27 and 270 is from 40 to 45 degrees.

In the operation of the device the length of the compartments is such relative to the size of the apparatus and a preferred speed of the conveyer that the bottles will take six minutes in passing beneath the compartment 20; 2½ minutes in passing beneath the compartment 22; 2½ minutes in passing beneath the compartment 24, 55 minutes in passing beneath the compartment 26, 2½ minutes beneath the compartment 34, and the compartment 32; 7 minutes beneath the compartment 30 and 15 minutes beneath the compartment 27. In other words, the water descending in showers forms three heating zones, a pasteurizing zone, three cooling zones, and a refrigerating zone. It will be understood that variations may be made in the number of zones and their temperatures within reasonable limits without departing from the principles of the invention.

In using the apparatus, water is supplied to the different compartments at the proper temperatures, these temperatures being controlled by thermostats where it is deemed desirable. The water falls in showers establishing the different zones. The curtains of relatively cold water at the terminal zones prevent the escape of steam from the innermost zone. The pumps are then started and the circulation established. The cases filled with milk bottles are then placed upon the conveyer in vertical rows at the feeding end of the apparatus, and the conveyer is started. As the cases pass within the apparatus additional cases are added, until in the course of the movement of the conveyer the device is entirely filled and the first rows of cases appear at the discharge end of the conveyer. Here skids with rollers are placed closely adjacent to the conveyer and the cases automatically leave the apparatus moving to any direction and extent which the skids may permit.

The protectors above the bottles prevent the caps or other sealing devices on the bottles from becoming unduly moistened with the falling water, while they permit access of the water to each bottle on all sides. Where pasteurization is sought to be accomplised by immersion in a body of water paper caps cannot be used while they may freely be employed with the described process.

Several matters should be noted in connection with the invention. The process of pasteurizing can begin as soon as the milk is delivered at the dairy. There is no need of waiting until a large mass of milk has been accumulated in order to economically employ a relatively large tank. Thus much time is saved and it is important that the milk should reach the consumer as soon as possible. The cooling compartments being connected to the heating compartments the heat units taken from the pasteurized milk in cooling serve to gradually heat the milk before its introduction to the pasteurizing zone. The expense of heating and cooling is thus reduced to a minimum. The bottles may be used at once after coming from the washing machine when they are usually warm and their heat can be utilized, whereas when milk is pasteurized in bulk the milk not being bottled until it is cold, the bottles must be cooled. The milk is not touched by anyone or contaminated by contact with any person or thing after it reaches the apparatus until it reaches the consumer. Any germs present in the milk from previous contact with workmen, utensils or other things, are destroyed while it is passing through the apparatus. The bottles and their caps or other closures are pasteurized as well as their contents. Considerable room is gained because the milk does not have to be accumulated to be pasteurized in bulk. The labor and expense of cleaning pasteurizing tank is eliminated. The keeping qualities of the milk are improved, and its bacteriological count is reduced as compared with milk pasteurized in bulk.

What I claim is:

1. A device of the character described comprising a receptacle, and means for establishing therein a series of zones of falling water of different temperatures, said zones arranged in communicating pairs, a central zone being of a pasteurizing temperature, and the zones on one side of the central zone progressively increasing in temperature and on the other side of the central zone progressively decreasing in temperature.

2. A device of the character described comprising a receptacle, and means for establishing therein a series of zones of falling water of different temperatures, a central zone being of a pasteurizing temperature, and the zones on one side of the central zone progressively increasing in temperature and on the other side of the central zone progressively decreasing in temperature, such means including a series of chambers arranged at the upper part of the receptacle, with foraminous bottoms to permit of the discharge of the water, the chambers progressively placed in communicating pairs with respect to the central chamber.

3. A device of the character described comprising a receptacle, and means for establishing therein a series of zones of falling water of different temperatures, a central zone being of a pasteurizing temperature, and the zones on one side of the central zone progressively increasing in temperature and on the other side of the central zone progressively decreasing in temperature, such means including a series of chambers arranged at the upper part of the receptacle, with foraminous bottoms to permit of the discharge of the water, the chambers progressively placed in communicating pairs with respect to the central chamber, and a similar series of chambers arranged at the lower part of the receptacle.

4. A device of the character described comprising a receptacle, and means for establishing therein a series of zones of falling water of different temperatures, a central zone being of a pasteurizing temperature, and the zones on one side of the central zone progressively increasing in temperature and on the other side of the central zone progressively decreasing in temperature, such means including a series of chambers arranged at the upper part of the receptacle, with foraminous bottoms to permit of the discharge of the water, the chambers progressively placed in communicating pairs with respect to the central chamber, and a similar series of chambers arranged at the lower part of the receptacle, and a series of lifting devices whereby the water descending from a communicating pair of upper chambers to a similar communicating pair of lower chambers is transferred from such lower chambers to such upper chambers.

5. An apparatus for pasteurizing milk in bottles comprising a receptacle with open ends, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs.

6. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, one of each pair being on opposite sides of the central tank.

7. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, one of each pair being on opposite sides of the central tank, and means for transferring water from the central tank and each pair of tanks of the lower series to the central tank and each corresponding pair of tanks of the upper series.

8. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, one of each pair being on opposite sides of the central tank, and means for transferring water from the central tank and each pair of tanks of the lower series to the central tank and each corresponding pair of tanks of the upper series including pumps.

9. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, one of each pair being on opposite sides of the central tank, and means for transferring water from the central tank and each pair of tanks of the lower series to the central tank and each corresponding pair of tanks of the upper series including pumps, one for each lower and upper pairs of tanks, and one for the central lower and upper tanks.

10. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, and means for supplying water at different temperatures to the upper series of tanks, the temperature of the water supplied to the tanks at the ends of the conveyer being lower than that supplied to the tank or tanks at the middle of the conveyer, and the temperature of the water supplied to the intermediate tanks progressively increasing in temperature from the ends toward the middle, all of the tanks except the central one being arranged in communicating pairs.

11. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, and means for supplying water at a pasteurizing temperature to the central upper tank.

12. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, and means for supplying water at a pasteurizing temperature to the central upper tank and water at progressively decreasing temperatures to the tanks on each side of it.

13. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, and means for supplying water at a pasteurizing temperature to the central upper tank and water at a progressively increasing temperature to the tanks on one side of it and at a progressively decreasing temperature to the tanks on the other side of it.

14. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, and means for supplying water at a pasteurizing temperature to the central upper tank and water at progressively decreasing temperatures to the communicating pairs of tanks on each side of it.

15. An apparatus for pasteurizing milk in bottles comprising a receptacle, a moving conveyer adapted to pass through the same, a series of spraying tanks arranged above the conveyer, a similar series of water collecting tanks arranged beneath the conveyer, each tank in both series being separated from its neighbor by a partition impervious to water, each series including a central tank larger than the others, and all of the other tanks in each series being arranged in communicating pairs, means for supplying water at a pasteurizing temperature to the central upper tank and water at progressively decreasing temperatures to the communicating pairs of tanks on each side of it, and means for transferring water from the central tank and each pair of tanks of the lower series to the central tank and each corresponding pair of tanks of the upper series.

16. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit.

17. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a second pair of tanks beyond the first pair, a communicating conduit between them and means for supplying water to them at a temperature of about 100 degrees Fahrenheit.

18. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a second pair of tanks beyond the first pair, a communicating conduit between them and means for supplying water to them at a temperature of about 100 degrees Fahrenheit, a third pair of tanks beyond the second pair, a communicating conduit between them and means for supplying water to them at a temperature of about 60 degrees Fahrenheit.

19. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a second pair of tanks beyond the first pair, a communicating conduit between them and means for supplying water to them at a temperature of about 100 degrees Fahrenheit, a third pair of tanks beyond the second pair, a communicating conduit between them and means for supplying water to them at a temperature of about 60 degrees Fahrenheit, and a tank on the discharge side of one member of the third pair and means for supplying it with water at a temperature lower than 60 degrees Fahrenheit.

20. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks, partitions impervious to water between the central tank and the pair of tanks, and means for supplying water to the pair of tanks at a temperature of about 130 degrees Fahrenheit.

21. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a series of tanks arranged below the conveyer consisting of a central tank adapted to receive the water falling from the upper central tank and a pair of tanks one on each side of such central lower tank, and adapted to receive the water falling from the pair of upper tanks.

22. An apparatus for pasteurizing milk in bottles comprising a receptacle, a conveyer adapted to move through the same from end to end, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a series of tanks arranged below the conveyer consisting of a central tank adapted to receive the water falling from the upper central tank and a pair of tanks one on each side of such central lower tank, and adapted to receive the water falling from the pair of upper tanks and a communicating conduit between the pair of lower tanks.

23. An apparatus for pasteurizing milk in bottles comprising a receptacle, a conveyer adapted to move through the same, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a second pair of tanks beyond the first pair, a communicating conduit between them and means for supplying water to them at a temperature of about 100 degrees Fahrenheit, a series of tanks arranged below the conveyer consisting of a central tank adapted to receive the water falling from the upper central tank and a pair of tanks one on each side of such central lower tank, and adapted to receive the water falling from the pair of upper tanks, and means for supplying water at a pasteurizing temperature to the central upper tank, and a communicating conduit between each pair of lower tanks.

24. An apparatus for pasteurizing milk in bottles comprising a receptacle, a conveyer adapted to move through the same, a series of spraying tanks arranged above the conveyer consisting of a central tank and means for supplying water to it at a pasteurizing temperature, a pair of tanks one on each side of the central tank, a communicating conduit between the pair of tanks and means for supplying water to the pair of tanks at a temperature of about 130 degrees Fahrenheit, a second pair of tanks beyond the first pair, a communicating conduit between them and means for supplying water to them at a temperature of about 100 degrees Fahrenheit, a series of tanks arranged below the conveyer consisting of a central tank adapted to receive the water falling from the upper central tank and a pair of tanks one on each side of such central lower tank, and adapted to receive the water falling from the pair of upper tanks, and means for supplying water at a pasteurizing temperature to the central upper tank, and a communicating conduit between each pair of lower tanks, and means for transferring the water from the lower central tank to the upper central tank, and from the first pair of lower tanks to the first pair of upper tanks and from the second pair of lower tanks to the second pair of upper tanks.

In testimony whereof I affix my signature in presence of two witnesses.

CHARLES H. LOEW.

Witnesses:
 ALDA L. MILLER,
 HELEN V. FITZPATRICK.